United States Patent [19]
Shinohara et al.

[11] Patent Number: 6,089,092
[45] Date of Patent: Jul. 18, 2000

[54] VIBRATION SENSOR

[75] Inventors: Kenji Shinohara; Hideyuki Bingo; Hideo Tashiro; Tatsuhide Morisawa, all of Kyoto-fu; Kazumitsu Nukui, Kanagawa, all of Japan

[73] Assignees: OMRON Corporation, Kyoto; Tokyo Gas Co., Ltd., Tokyo, both of Japan

[21] Appl. No.: 09/080,636

[22] Filed: May 18, 1998

[51] Int. Cl.[7] .................................................... G01P 15/00
[52] U.S. Cl. ..................... 73/514.01; 73/1.38; 73/1.39; 200/61.45 R
[58] Field of Search ............................. 73/514.01, 1.38, 73/1.39; 200/61.45 R, 61.52

[56] References Cited

U.S. PATENT DOCUMENTS

| | | | |
|---|---|---|---|
| 3,703,102 | 11/1972 | Prachar | 73/514.01 |
| 4,311,891 | 1/1982 | Faust | 200/61.45 R |

*Primary Examiner*—Hezron Williams
*Assistant Examiner*—Richard A. Moller
*Attorney, Agent, or Firm*—Morrison & Foerster LLP

[57] ABSTRACT

A single vibration sensor producing multistage outputs corresponding to various vibrational acceleration values is disclosed. This vibration sensor is the type in which vibrational acceleration causes a movable gravitation element to move, and the movement of the element exerts pressure on a plunger which actuates a switch mechanism and outputs a signal. A feature of this vibration sensor is the switch mechanism includes a number of discrete switch units each having a different operating sensitivity. The switch units have a number of movable members which are displaced by the plunger when the vibrational acceleration causes the movable gravitation element to move, and a number of fixed contacts corresponding to these movable members with which the movable contacts come in contact. The spatial relationship of the fixed contacts with respect to the movable members is a feature which determines the operational sensitivity.

9 Claims, 10 Drawing Sheets

VIBRATION SENSOR

FIELD OF THE INVENTION

This invention concerns a sensor for detecting earthquakes or vibration.

BACKGROUND OF THE INVENTION

In an existing vibration sensor, as can be seen in FIG. 17, there are three forces which act on a sphere (movable gravitation element) 70: the force $F_1$ of gravitational acceleration; the force $F_2$ of seismic acceleration; and the spring force $F_3$ of movable member 71. The movement of sphere 70 is determined by the ratio of each of forces $F_1$, $F_2$ and $F_3$ in the direction of an incline.

When a given seismic acceleration G acts on the vibration sensor, the component of force $F_2$ in the direction of the incline which is due to seismic acceleration G becomes larger than the component of force $F_1$ in the direction of the incline which is due to the gravitational acceleration which acts on sphere 70. Sphere 70 moves from rest 72 to conical surface 73 and pushes plunger 74 upward. Plunger 74 then actuates projection 75, which in turn pushes movable member 71 upward at pressure point A and causes it to bend. Movable contact 76 on movable member 71 comes in contact with fixed contact 77, which closes the switch and detects the seismic acceleration G.

The prior art vibration sensor described above detects vibration only when the force exceeds a given seismic acceleration G. If we wish to apply different processing according to the magnitude of the seismic acceleration, we have no choice but to employ a number of discrete vibration sensors.

SUMMARY OF THE INVENTION

This invention was developed in consideration of the problem described above. An objective of the invention is to provide a vibration sensor having multistage outputs corresponding to various seismic acceleration values.

To achieve the above objective, a vibration sensor for sensing a vibrational acceleration is disclosed. This vibration sensor includes a movable gravitation element which is movable by the vibrational acceleration, a plunger detecting a movement of the movable gravitation element and a switch mechanism actuated by the plunger. A feature of this vibration sensor is the switch mechanism includes a number of switch units each having a different operating sensitivity. An advantage of this is each switch unit outputs a signal when it detects the vibrational acceleration which corresponds to its own operating sensitivity. As a result, a single vibration sensor producing multistage outputs corresponding to various vibrational acceleration values is achieved.

Another feature of the invention is each of the switch units includes a movable member which is displaced by the movable gravitation element and a number of fixed contacts with which the movable member comes into contact. An advantage of this feature is the movable member operates in a series of stages depending on the vibrational acceleration so that for a given vibration, the movable member comes in contact with whichever of the fixed contacts that corresponds to that particular vibrational acceleration.

Another feature of the invention is each of the switch units includes a number of movable members which are displaced by the plunger when the vibrational acceleration causes the movable gravitation element to move, and a number of fixed contacts corresponding to these movable members with which the movable members come in contact. The spatial relationship of the fixed contacts with respect to the movable members determines the operational sensitivity. An advantage of this feature is the movable member corresponding to a given acceleration operates when that acceleration is experienced, and it comes in contact with its paired fixed contacts.

Another feature of the invention is the movable gravitation element of the vibration sensor may be a sphere or a pendulum.

Another feature of the invention is the vibration sensor includes means for adjusting the operating sensitivity of the sensor. An advantage of this feature is in addition to being able to use the sensor, the operating sensitivity can be adjusted in producing multistage outputs.

Another feature of the invention is the adjusting means consists of a gap adjusting means for adjusting a gap between the contact on the movable member and the fixed contact. An advantage of this feature of the invention is the gap between a contact on the movable member and the fixed contact can be adjusted by the gap adjusting means for that purpose. That is, in addition to being able to use the sensor, the sensitivity can be adjusted in producing multistage outputs.

Another feature of the invention is the switch units in the vibration sensor are snap-action type switches. An advantage of the snap-action switches is they minimize any fluctuation in the operating sensitivity.

Yet another feature of the invention is the switch mechanism consists of a number of switch units with different operating sensitivities. With regard to this feature of the invention, a number of variables are used to determine the operating sensitivities, such as vibrational force $F_2$, a component of force $F_2$ in the direction of the incline ($F_2'$), gravitational acceleration force $F_1$, and a component of force $F_1$ in the direction of the incline ($F_1'$). The inclined surface onto which the sphere moves when $F_2'$ becomes larger than $F_1'$ consists of a number of inclined surfaces with different angles of inclination which correspond to various operating sensitivities. An advantage of this feature is a vibrational acceleration of a given magnitude causes the sphere to move onto the inclined surface which corresponds to that magnitude of acceleration, and this exerts pressure on the plunger to actuate one of the switch units. Thus, a single vibration sensor producing multistage outputs corresponding to various vibrational accelerations is achieved.

The above features and advantages of the invention will be better understood from the following detailed description taken into conjunction with the accompanying drawings.

BRIEF DESCRIPTION OF THE DRAWINGS

FIG. 4 illustrates the principle underlying the operation of the vibration sensor. In particular.

DETAILED DESCRIPTION OF THE INVENTION

In this section we shall discuss several embodiments of this invention with reference to the drawings.

Embodiment 1

A vibration sensor which is the first ideal embodiment of this invention is illustrated in FIGS. 1 through 5.

Figure 1:
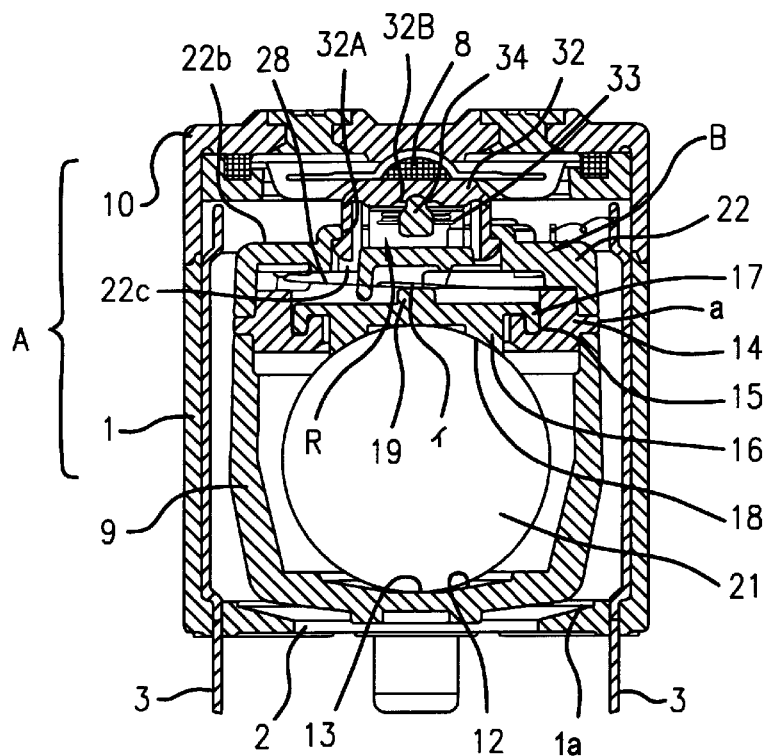
FIG. 1 is a vertical cross section of a vibration sensor which is the first ideal embodiment of this invention.
Figure 2:
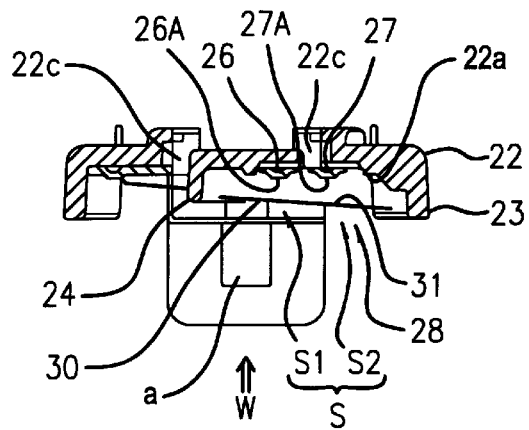
FIG. 2 is a cross section of the base and switch mechanism in the same vibration sensor.
Figure 3:
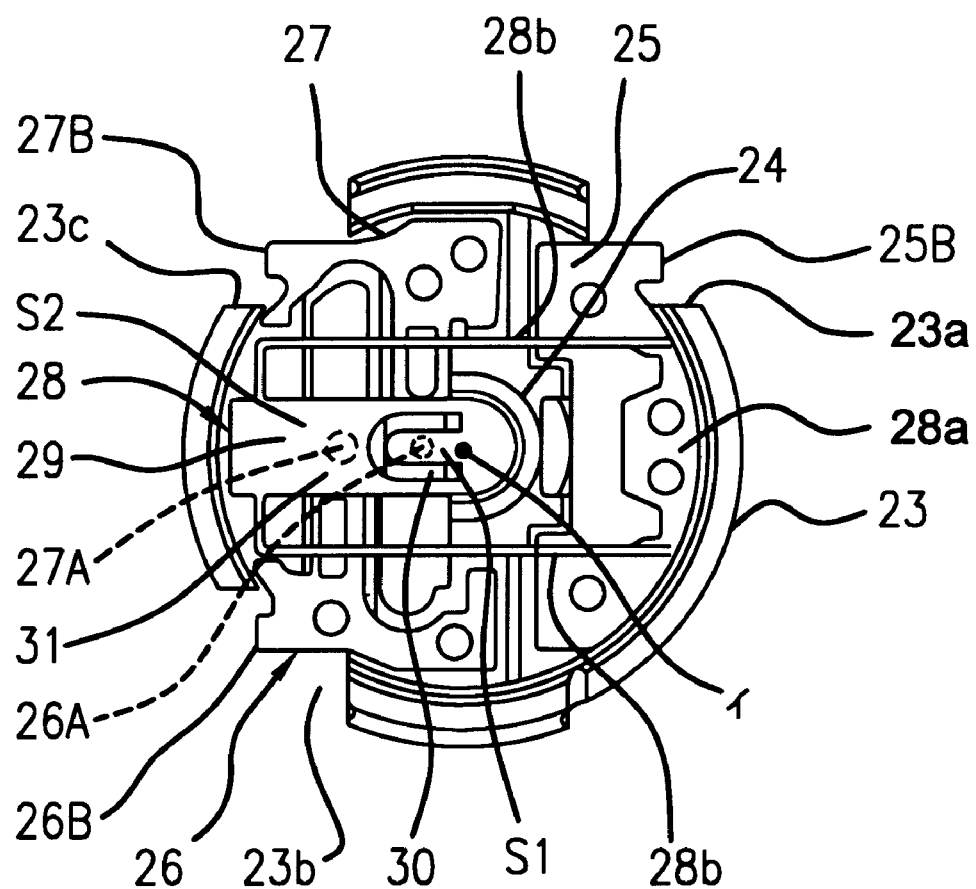
FIG. 3 is a view of the sensor in FIG. 2 from point W.

FIG. 1 is a vertical cross section of a vibration sensor which is the first ideal embodiment of this invention. FIG. 2 is a cross section of the base and switch mechanism. FIG. 3 is a view of the sensor in FIG. 2 from point W. FIG. 4 illustrates the principle underlying the operation of the sensor. In particular, FIGS. 4(A)–4(D) illustrate a vector analysis of forces $F_1$, $F_2$ and $F_3$, the force resulting from gravitational acceleration, the force resulting from seismic acceleration and the spring force of the movable member. FIG. 5 shows the relationship between the stroke of the plunger and the load.

The vibration sensor of the first ideal embodiment of this invention is a two-stage output sensor. This sensor consists primarily of cylindrical external case 1, cap 10, damper 8 and vibration sensor mechanism B. Cap 10 covers the external case 1 and, together, they constitute package A. Damper 8 is attached to the interior surface of cap 10 and vibration sensor mechanism B is enclosed in package A.

The top of the external case 1 is left open. There is an aperture 2 on its bottom surface 1a. On the interior periphery of external case 1 are two external common terminals 3, which run through bottom surface 1a of external case 1 and protrude to the exterior. Two external fixing terminals (not pictured) are mounted on the external periphery of external case 1.

The vibration sensor mechanism B is surrounded by internal case 9. Conical surface 12, with a slope of angle α, (see, for example, FIG. 4(A)) is formed on the lower surface 11 of internal case 9. In the center of conical surface 12 is rest 13, on which is seated a sphere (movable gravitation element) 21.

Guide 14 is affixed to the upper end of internal case 9. An annular groove 15 which is open on top is formed on the inner periphery of guide 14. The annular pendant portion 17 of the external periphery of plunger 16 fits into groove 15 of guide 14 in such a way that it can slide up and down. On the underside of plunger 16 is sphere receptor 18; on the upper surface of the plunger is projection 19, which actuates the sensor.

Sphere 21, which is the movable object, is enclosed within the internal case 9. It is seated on rest 13, with receptor 18 of plunger 16 in contact with its upper surface.

Base 22 is attached to the guide 14. As can be seen in FIGS. 1 through 3, base 22 has a wall 23 which runs all along its periphery. This wall 23 has three gaps, 23a, 23b and 23c. In the center of the undersurface 22a of base 22 is semicircular stop 24. Plate-like internal common terminal 25 is fixed on one side of the undersurface. First and second internal fixed terminals 26 and 27 are arranged in parallel on the undersurface of the base on the side opposite common terminal 25. Fixed contact 26A projects from first fixed terminal 26, and fixed contact 27A from second fixed terminal 27.

The base 28a of movable member 28 is fixed to the internal common terminal 25. In movable member 28, card-shaped movable contact element 29 is fixed to the front portions of two narrow strips 28b, both of which are fixed to base 28a. Pressure point A and movable contact 30 are on the end of movable contact element 29. The center of movable contact element 29 serves as movable contact 31. Movable contact element 29 sits atop internal fixed terminals 26 and 27 and lies across both of them.

First switch unit $S_1$ comprises movable contact 30 on movable member 28 and first fixed contact 26A on internal fixed terminal 26. Second switch unit $S_2$ comprises movable contact 31 on movable member 28 and second fixed contact 27A on internal fixed terminal 27. Together, first and second switch units $S_1$ and $S_2$ constitute switch mechanism S.

Winding site 25b on the base of the common terminal 25 projects out to the exterior through gap 23a. Winding site 26b on the base of internal fixed terminal 26 projects out to the exterior through gap 23b. Winding site 27b on the base of internal fixed terminal 27 projects out to the exterior through gap 23c.

When base 22 is fixed to the top of guide 14, projection 19 on plunger 16 is in contact with pressure point A on movable member 28, as can be seen in FIG. 1.

Legs 32A engage in holes 22c on upper surface 22b of the base 22. Gate-shaped suspending component 32 is suspended from the base. Crosspiece 33 is inserted into component 32. Fulcrum 8 is fixed to the center of crosspiece 33. It is mounted to the lower surface of horizontal portion leg 32A of component 32 in such a way that it can swing. Together, these components constitute suspended mechanism R.

When a vibration sensor mechanism B configured as described above is inserted in external case 1, the ends of crosspiece 33 are supported by ledges (not pictured) on the upper edge of the case. When in this state the cap 10 is fixed to the top of external case 1, damper 8 on the inner surface of cap 10 is placed in contact with suspending component 32. Winding site 27B on internal fixed terminal 27 is fixed by a lead wire to its external fixed terminal. Winding site 25A on internal common terminal 25 is fixed by a lead wire to external common terminal 3.

We shall next discuss the operation of a vibration sensor configured as described above.

Figure 4B:
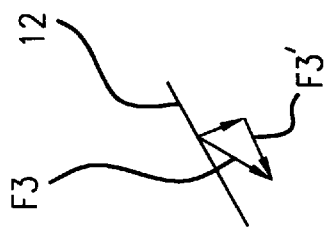
FIGS. 4(A)–4(D) are a vector analysis of forces $F_1$, $F_2$ and $F_3$, the force resulting from gravitational acceleration, the force resulting from seismic acceleration and the spring force of the movable member.
Figure 4C:
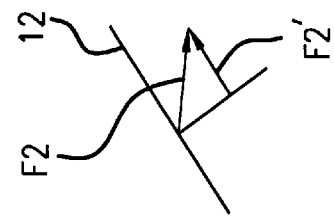
Figure 4D:
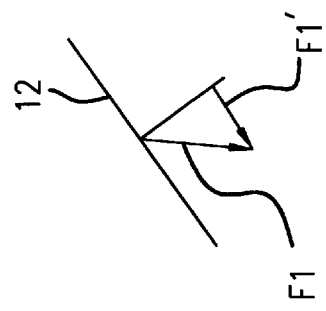
Figure 4A:
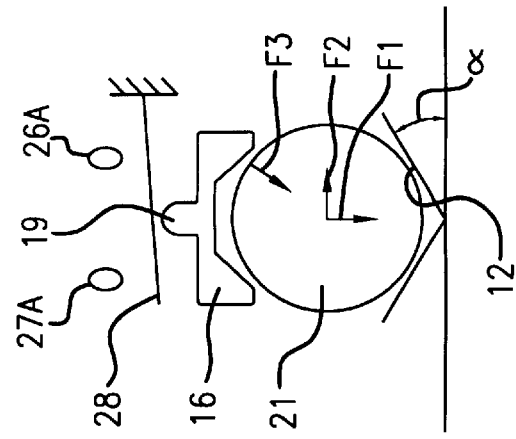
Figure 5:
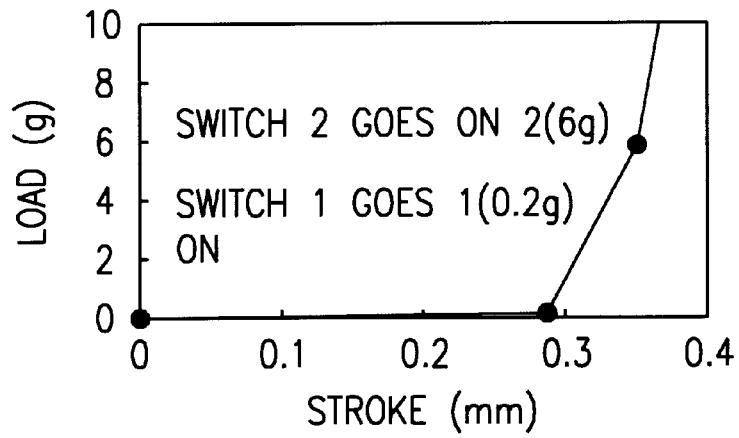
FIG. 5 shows the relationship between the stroke of the plunger and the load in the same vibration sensor.

As can be seen in FIG. 4(A), sphere 21 is acted upon by three forces: $F_1$, the gravitational acceleration force; $F_2$, the seismic (or vibrational) acceleration force; and $F_3$, the spring force of movable member 28. Which way sphere 21 will move is determined by the proportional weight of three components $F_1'$, $F_2'$ and $F_3'$. These are the components of the three forces in the direction of the incline.

Until movable contact 30 on movable member 28 touches fixed contact 26A on internal fixed contact terminal 26 (i.e., until switch unit $S_1$ closes), spring load $F_3$ may be considered infinitely small. The magnitude of seismic acceleration G which will cause switch unit $S_1$ to go on is determined by the angle α of the incline, which is the slope of conical surface 12. When switch unit $S_1$ closes, the spring in movable member becomes shorter, so spring load $F_3$ increases. The load when movable contact 31 on movable member 28 comes in contact with fixed contact 27A on internal fixed terminal 27 (i.e., when switch unit $S_2$ closes) is determined by spring load $F_3$ (i.e., by the contact gap).

When a seismic acceleration $G_1$ acts on the vibration sensor and the incline component $F_2'$ of the force $F_2$ resulting from this acceleration becomes larger than the incline component $F_1'$ of the force $F_1$ due to gravitational acceleration, sphere 21 will be dislodged from rest 13 and moves onto conical surface 12. The sphere will push upward against plunger 16, and projection 19 on the plunger will press upward against movable member 28 at pressure point A, causing member 28 to bend. Movable contact 30 on movable member 28 will come in contact with fixed contact 26A on internal fixed terminal 26, and switch unit $S_1$ will close, detecting the seismic acceleration $G_1$ experienced at that moment.

When a seismic acceleration $G_2$ becomes larger than the seismic acceleration $G_1$ acts on the vibration sensor and the incline component $F_2'$ of the force $F_2$ resulting from this acceleration becomes larger than the incline component $F_1'$ of the force $F_1$ due to gravitational acceleration, sphere 21 will again be dislodged from rest 13 and moves onto conical surface 12. The sphere will again push upward against plunger 16, and projection 19 on the plunger will press upward against movable member 28 at pressure point A, causing member 28 to bend. Movable contact 30 on movable member 28 will come in contact with fixed contact 26A on internal fixed terminal 26, and movable member 28 will bend. Movable contact 31 on movable member 28 will come in contact with fixed contact 27A on internal fixed terminal 27, and switch unit $S_2$ will close, detecting the seismic acceleration $G_2$ experienced at that moment.

The relationship between the stroke of plunger 16 and spring load $F_3$ at this time is shown in FIG. 5. Switch unit $S_1$ will close at a spring load $F_3$ of 0.2 g; and switch unit $S_2$ will close at 6 g.

Embodiment 2

Figure 6:
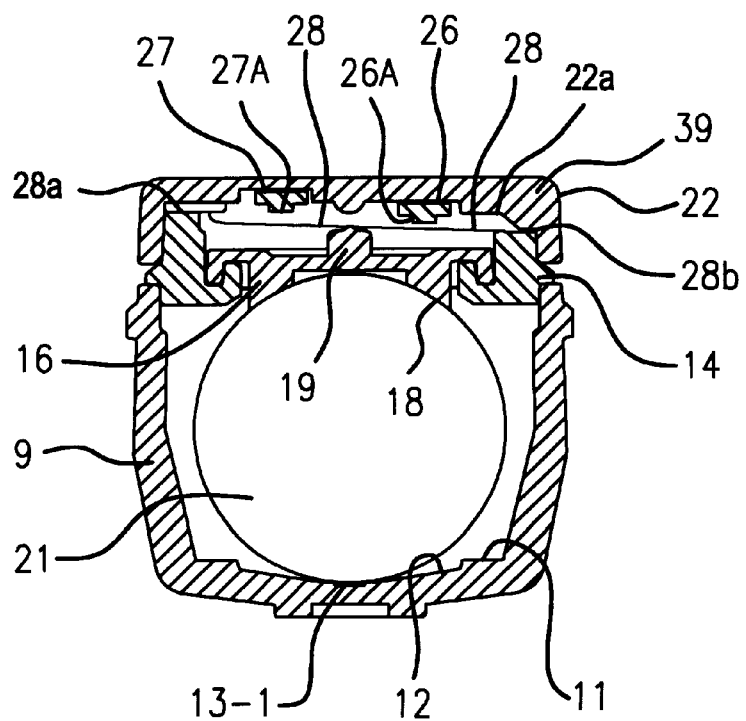
FIG. 6 is a vertical cross section of a vibration sensor which is the second ideal embodiment of this invention.
Figure 7:
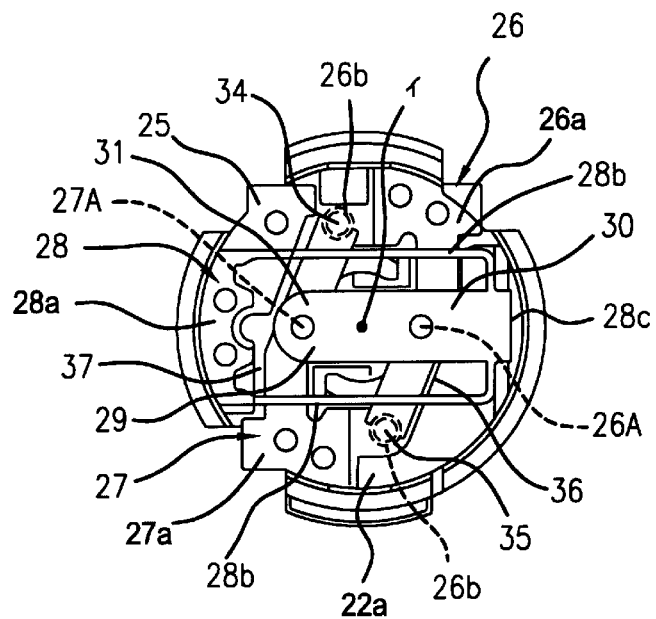
FIG. 7 is a plan view of the switch mechanism in the same vibration sensor.

The vibration sensor which is the second embodiment of this invention is pictured in FIGS. 6 through 8.

FIG. 6 is a vertical cross section of a vibration sensor which is the second ideal embodiment of this invention. FIG. 7 is a plan view of the switch mechanism in the same vibration sensor. FIGS. 8 (1) and (2) show how this vibration sensor works.

In the vibration sensor of the second ideal embodiment of this invention, both ends of movable member 28 are supported, and a movable member providing the movable contacts are supported on one side only. In addition, the heights of fixed contacts 26A and 27A on internal fixed terminals 26 and 27 are adjustable.

Conical surface 12 on the bottom 11 of internal case 9 in vibration sensor mechanism B of this vibration sensor has an incline of angle a. In the center of conical surface 12 is rest 13-1, which consists of a depression on which sphere 21 is seated. Plate-shaped internal common terminal 25 is fixed to one side of the undersurface 22a of base 22. Two grooves, 36 and 37, straddle the center of the base to its right and left; the terminals are inlaid in these grooves. Internal fixed terminal 26 is inlaid in groove 36; internal fixed terminal 27 is inlaid in groove 37. Terminals 26 and 27 are run parallel to each other.

Extremity 26a of internal fixed terminal 26 is fixed to undersurface 22a. Screw 34, the gap adjusting means to adjust the gap and thereby change the sensitivity of the sensor, is screwed into base 22. The end of screw 34 is in contact with the free end 26b of internal fixed terminal 26. Extremity 27a of internal fixed terminal 27 is also fixed to undersurface 22a. Screw 35, the second gap adjusting means to adjust the gap and thereby change the sensitivity of the sensor, is screwed into base 22. The end of screw 35 is in contact with the free end 27b of internal fixed terminal 27. Fixed contact 26A projects from internal fixed terminal 26; fixed contact 27A projects from internal fixed terminal 27.

One end (the base portion) 28a, of movable member 28, is fixed to the internal common terminal 25. The other end, 28c, is held between pressure ridge 39 on base 22 and the top edge of guide 14.

In movable member 28, card-shaped movable contact element 29 is fixed to the front portions of two narrow strips 28b, both of which are fixed to base 28a. Pressure point A and first and second movable contacts 30 and 31 are on movable contact element 29. Movable contact element 29 sits atop internal fixed terminals 26 and 27 and lies across both of them.

First switch unit $S_1$ comprises movable contact 30 on movable member 28 and fixed contact 26A on first internal fixed terminal 26. Second switch unit $S_2$ comprises movable contact 31 on movable member 28 and fixed contact 27A on second internal fixed terminal 27. Together, first and second switch units $S_1$ and $S_2$ constitute switch mechanism S.

Sphere 21 is enclosed within the internal case 9. It is seated on rest 13-1, with receptor 18 of plunger 16 in contact with its upper surface. When base 22 is fixed to the top of guide 14, projection 19 on plunger 16 is in contact with pressure point A on movable member 28. Other aspects of this sensor which are identical to corresponding aspects of the first embodiment will not be discussed for brevity reason.

In this case, the forces acting on sphere 21 are $F_1$, the gravitational acceleration force; $F_2$, the seismic acceleration force; and $F_3$, the spring force of movable member 28. Which way sphere 21 will move is determined by the proportional weight of three components, $F_1'$, $F_2'$ and $F_3'$. These are the components of the three forces in the direction of the incline. (See FIG. 4.)

Figure 8A:
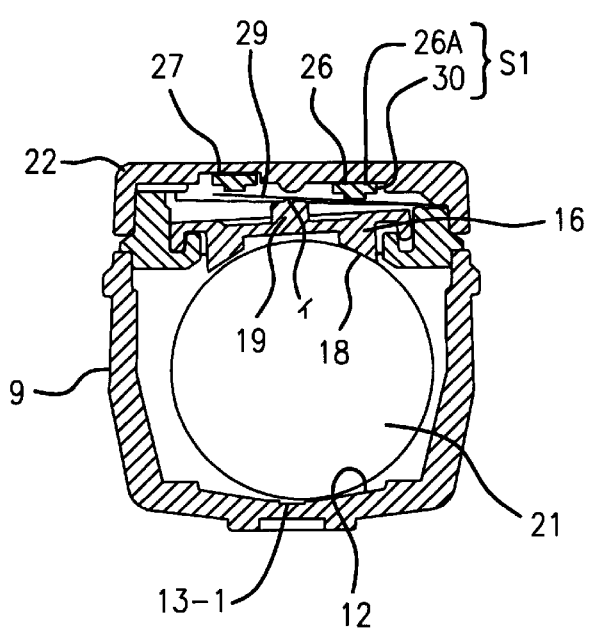
FIGS. 8(A) and 8(B) show how this vibration sensor works.

When a seismic acceleration $G_1$ acts on the vibration sensor and the incline component $F_2'$ of the force $F_2$ resulting from this acceleration becomes larger than the incline component $F_1'$ of the force $F_1$ due to gravitational acceleration, sphere 21 will be dislodged from rest 13 as in FIG. 8(A) and moves onto conical surface 13-1. The sphere will push upward against plunger 16, and projection 19 on the plunger will press upward against movable member 28 at pressure point A, causing member 28 to bend. Movable contact 30 on movable member 28 will come in contact with fixed contact 26A on first internal fixed terminal 26, and first switch unit $S_1$ will close, detecting the seismic acceleration $G_1$ experienced at that moment.

Figure 8B:
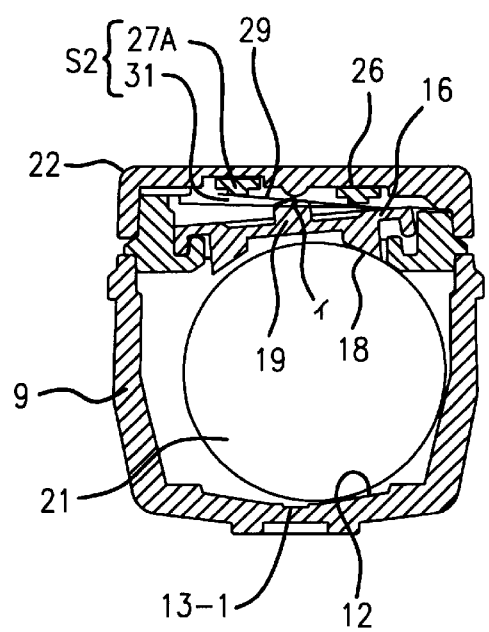

When a seismic acceleration $G_2$ becomes larger than the seismic acceleration $G_1$, acts on the vibration sensor and the incline component $F_2'$ of the force $F_2$ resulting from this acceleration becomes larger than the incline component $F_1'$ of the force $F_1$ due to gravitational acceleration, sphere 21 will again be dislodged from rest 13 and move onto conical surface 13-1, as shown in FIG. 8(B). The sphere will again push upward against plunger 16, and projection 19 on the plunger will press upward against movable member 28 at pressure point A, causing member 28 to bend. Movable contact 30 on movable member 28 will come in contact with fixed contact 26A on first internal fixed terminal 26, and movable member 28 will bend. Movable contact 31 on movable member 28 will, then, come in contact with fixed contact 27A on second internal fixed terminal 27, and second switch unit $S_2$ will close, detecting the seismic acceleration $G_2$ experienced at that moment.

To adjust the distance (i.e., the gap) between fixed contact 26A on first internal fixed terminal 26 and movable member 28 (movable contact 30), the user turns screw 34 to bend or straighten first internal fixed terminal 26. To adjust the distance (or gap) between fixed contact 27A on second internal fixed terminal 27 and movable member 28 (movable contact 31), the user turns screw 35 to bend or straighten second internal fixed terminal 27.

Embodiment 3

Figure 9:
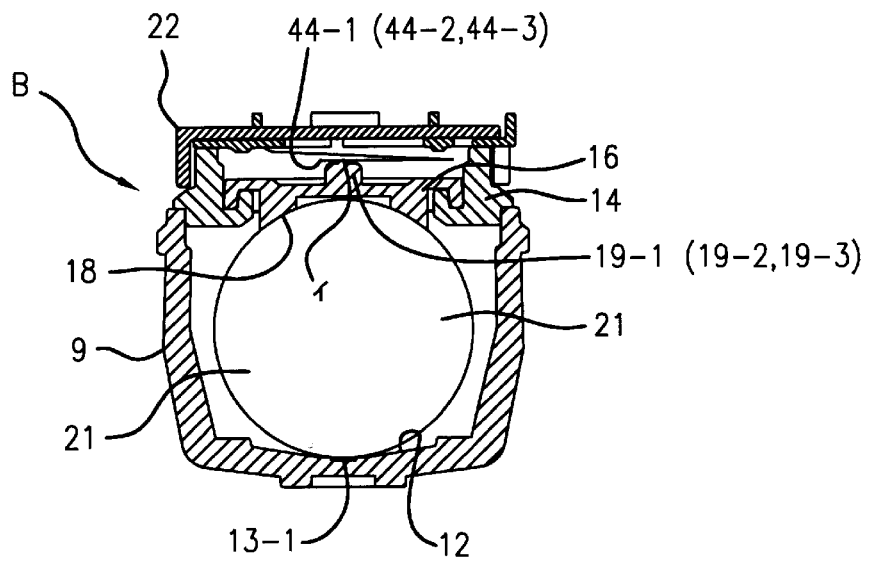
FIG. 9 is a vertical cross section of the vibration sensor which is the third ideal embodiment of this invention.
Figure 10:
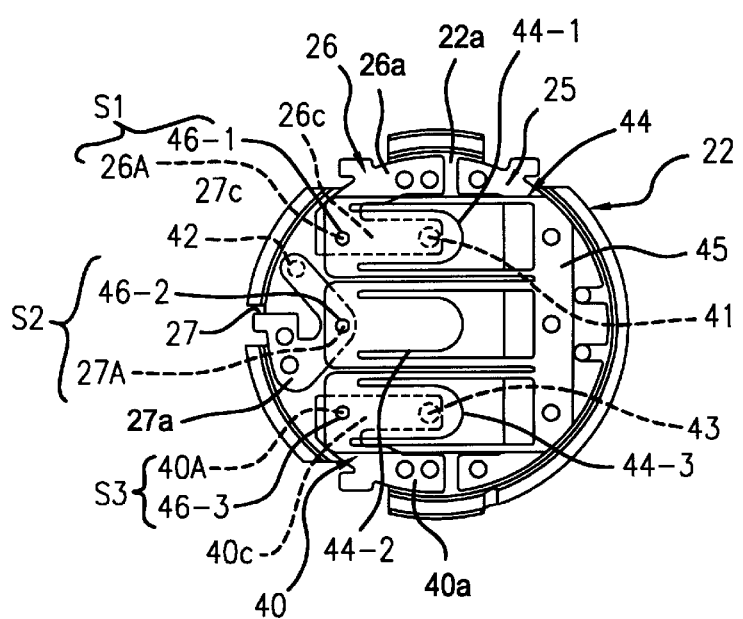
FIG. 10 is a plan view of the switch mechanism in the same vibration sensor.
Figure 11:
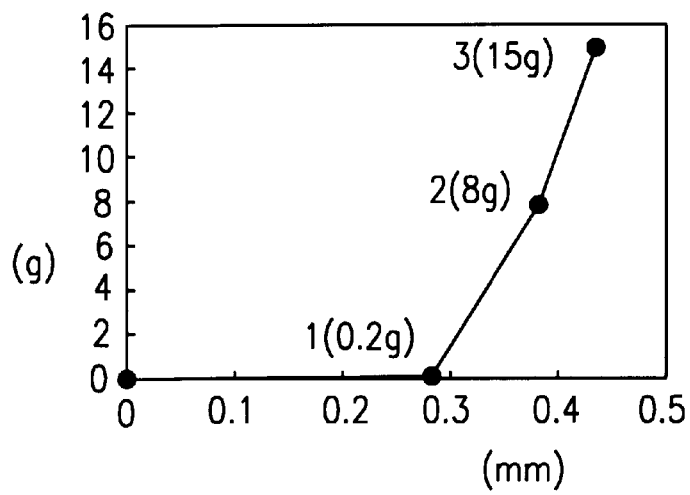
FIG. 11 shows the relationship between the stroke of the plunger the load in this vibration sensor.

The vibration sensor which is the third ideal embodiment of this invention is shown in FIGS. 9 through 11.

FIG. 9 is a vertical cross section of the vibration sensor of the third ideal embodiment of this invention. FIG. 10 is a plan view of the switch mechanism in the same vibration sensor.

The third embodiment of the vibration sensor of this invention has three output stages. Conical surface 12 on the bottom 11 of internal case 9 in vibration sensor mechanism B of this vibration sensor has an incline of angle α. In the center of conical surface 12 is rest 13-1, which consists of a depression on which sphere 21 is seated. Plate-shaped internal common terminal 25 is fixed to one side of the undersurface 22a of base 22. Internal fixed terminals 26, 27 and 40 are fixed to base portions 26a, 27a and 40a, respectively, on the undersurface of base 22.

The free ends of internal fixed terminals 26, 27 and 40 serve as spring elements 26c, 27c and 40c. Spring elements 26c and 40c of terminals 26 and 40 are card-shaped, and fixed contacts 26A and 40A are on their base ends. Spring element 27c of internal fixed terminal 27 is bent so that it is V-shaped. Fixed contact 27A is at the intersection of the two arms of the V-shaped fixed terminal.

Three screws, 41, 42 and 43, are screwed into base 22 to allow the gap to be adjusted. These screws serve as the adjusting means to adjust the sensitivity of the sensor. The end of screw 41 is in contact with the free end of spring element 26c of internal fixed terminal 26. The end of screw 42 is in contact with the free end of spring element 27c of internal fixed terminal 27. The end of screw 43 is in contact with the free end of spring, element 40c of internal fixed terminal 40.

Movable member 44 consists of three units, 44-1, 44-2 and 44-3, on mounting base 45. Units 44-1, 44-2 and 44-3 are fixed to movable contact unit 46 at the front ends of two wirelike extensions 44b, which are fixed to mounting base 45. The front end of movable contact unit 46 serves as pressure point A.

Movable member 44 is fixed to the internal common terminal 25 at mounting base 45. Unit 44-1 is placed over spring element 26c of internal fixed terminal 26; unit 44-2 is placed over spring element 27c of internal fixed terminal 27; and unit 44-3 is placed over spring element 40c of internal fixed terminal 40.

Projections 19-1, 19-2 and 19-3 on plunger 16 correspond to units 44-1, 44-2 and 44-3, respectively.

Sphere 21 is inside the internal case 9. It is seated on rest 13-1, and receptor 18 on plunger 16 is in contact with its upper surface. Base 22 is fixed to the top of guide 14. Projections 19-1, 19-2 and 19-3 on plunger 16 are in contact with pressure points A of units 44-1, 44-2 and 44-3. Other aspects of the configuration of the sensor that are identical to corresponding aspects of the first embodiment will not be discussed for brevity reason.

In this case, the forces acting on sphere 21 are $F_1$, the gravitational acceleration force; $F_2$, the seismic acceleration force; and $F_3$, the spring force of movable unit 44-1 (or 44-2, or 44-3). Which way sphere 21 will move is determined by the proportional weight of three components, $F_1'$, $F_2'$ and $F_3'$. These are the components of the three forces in the direction of the incline. (See FIG. 4.)

When a seismic acceleration $G_1$ acts on the vibration sensor and the incline component $F_2'$ of the force $F_2$ resulting from this acceleration becomes larger than the incline component $F_1'$ of the force $F_1$ due to gravitational acceleration, sphere 21 will be dislodged from rest 13-1 and moves onto conical surface 12. The sphere will push upward against plunger 16, and projection 19-1 on the plunger will press upward against movable unit 44-1 at pressure point A, causing unit 44-1 to bend. Movable contact 46-1 on movable contact element 46 will come in contact with fixed contact 26A on internal fixed terminal 26, and switch unit $S_1$ Will close, detecting the seismic acceleration $G_1$ experienced at that moment.

When a seismic acceleration $G_2$ becomes larger than the seismic acceleration $G_1$ acts on the vibration sensor and the incline component $F_2'$ of the force $F_2$ resulting from this acceleration becomes larger than the incline component $F_1'$ of the force $F_1$ due to gravitational acceleration, sphere 21 will again be dislodged from rest 13-1 and moves onto conical surface 12. The sphere will again push upward against plunger 16, and projection 19-2 on the plunger will press upward against movable unit 44-2 at pressure point A, causing unit 44-2 to bend. Movable contact 46-2 on movable unit 44-2 will come in contact with fixed contact 27A on internal fixed terminal 27, and switch unit $S_2$ will close, detecting the seismic acceleration $G_2$ experienced at that moment.

When a seismic acceleration G3 becomes larger than the seismic acceleration $G_2$ acts on the vibration sensor and the incline component $F_2'$ of the force $F_2$ resulting from this acceleration becomes larger than the incline component $F_1'$ of the force $F_1$ due to gravitational acceleration, sphere 21 will again be dislodged from rest 13-1 and moves onto conical surface 12. The sphere will again push upward against plunger 16, and projection 19-3 on the plunger will press upward against movable unit 44-3 at pressure point A, causing unit 44-3 to bend. Movable contact 46-3 on movable unit 44-3 will come in contact with fixed contact 40A on internal fixed terminal 40, and switch unit $S_3$ will close, detecting the seismic acceleration $G_3$ experienced at that moment.

The relationship which obtains at this time between the stroke of plunger 16 and spring load $F_3$ is shown in FIG. 11. Switch unit $S_1$ will close at a spring load $F_3$ of 0.2 g; switch unit $S_2$ will close at a load of 8 g; and switch unit $S_3$ will close at a load of 15 g.

Embodiment 4

Figure 12:
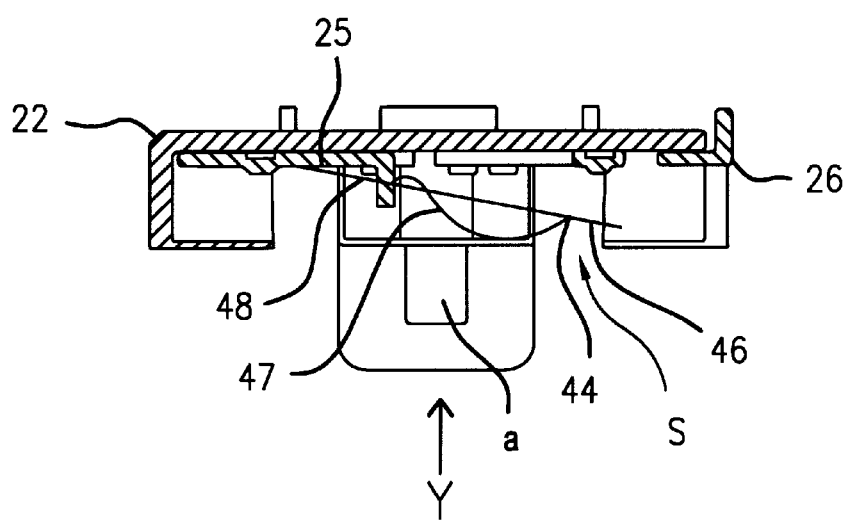
FIG. 12 is a cross section of the base and the switch mechanism of the vibration sensor which is the fourth embodiment of this invention.
Figure 13:
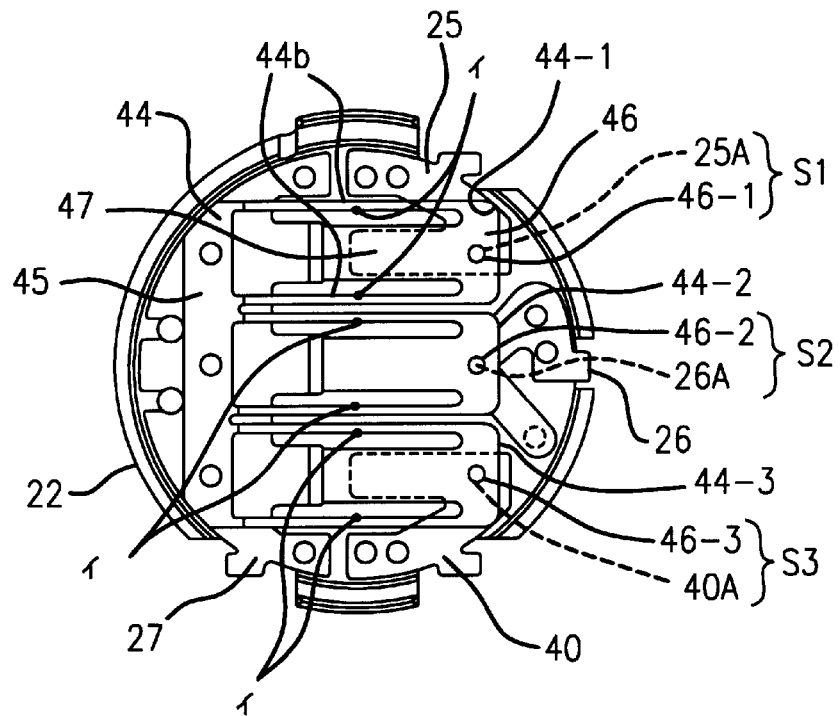
FIG. 13 is the same base viewed from Y in FIG. 12.
Figure 14:
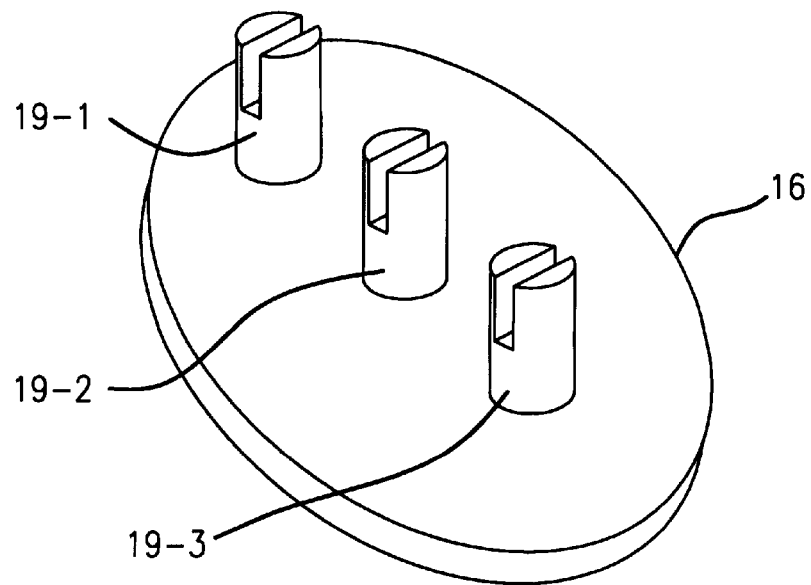
FIG. 14 illustrates the plunger.

A vibration sensor which is the fourth ideal embodiment of this invention is pictured in FIGS. 12 through 14.

FIG. 12 is a cross section of the base and the switch mechanism of the vibration sensor which is the fourth embodiment of this invention. FIG. 13 is the same base viewed from Y in FIG. 12.

This vibration sensor of the fourth embodiment is similar to the third embodiment described above, except that a snap-action switch is used as switch mechanism S. Since all other aspects of its configuration are identical to those of the third embodiment, we shall not discuss them further at this point.

Snap-action switch mechanism S has three movable units, 44-1, 44-2 and 44-3, on base 45 of movable element 44. These movable units are fixed to movable contact 46 at the front ends of two wirelike extensions 44b, which are fixed to mounting base 45. Spring 47 is fixed to the rear end of movable contact 46.

Movable member 44 is fixed to the internal common terminal 25 at mounting base 45. Unit 44-1 is placed over spring element 26c of internal fixed terminal 26; unit 44-2 is placed over spring element 27c of internal fixed terminal 27; and unit 44-3 is placed over spring element 40c of internal fixed terminal 40. The free ends of springs 47 of units 44-1, 44-2 and 44-3 are anchored in groove 48 on internal common terminal 25.

Projections 19-1, 19-2 and 19-3 on plunger 16, which can be seen in FIG. 14, correspond to units 44-1, 44-2 and 44-3, respectively. These projections straddle the springs 47 of the three units and are in contact with the pressure points A of the two long extensions 44b.

In this case, the forces acting on sphere 21 are $F_1$, the gravitational acceleration force; $F_2$, the seismic acceleration force; and $F_3$, the spring force of movable unit 44-1 (or 44-2, or 44-3). Which way sphere 21 will move is determined by $F_1$, $F_2$ and $F_3$ and by the proportional weight of three components $F_1'$, $F_2'$ and $F_3'$. These are the components of the three forces in the direction of the incline. (See FIG. 4.)

When a seismic acceleration $G_1$ acts on the vibration sensor and the incline component $F_2'$ of the force $F_2$ resulting from this acceleration becomes larger than the incline component $F_1'$ of the force $F_1$ due to gravitational acceleration, sphere 21 will be dislodged from rest 13-1 and moves onto conical surface 12. The sphere will push upward against plunger 16, and projection 19-1 on the plunger will press upward against movable unit 44-1 at pressure point A, causing unit 44-1 to bend. Movable contact 46-1 on movable unit 44-1 will come in contact with fixed contact 26A on internal fixed terminal 26, and switch unit $S_1$ will close, detecting the seismic acceleration $G_1$ experienced at that moment.

When a seismic acceleration $G_2$ becomes larger than the seismic acceleration $G_1$ acts on the vibration sensor and the incline component $F_2'$ of the force $F_2$ resulting from this acceleration becomes larger than the incline component $F_1'$ of the force $F_1$ due to gravitational acceleration, sphere 21 will again be dislodged from rest 13-1 and moves onto conical surface 12. The sphere will again push upward against plunger 16, and projection 19-2 on the plunger will press upward against movable unit 44-2 at pressure point A, causing unit 44-2 to bend. Movable contact 46-2 on movable unit 44-2 will come in contact with fixed contact 27A on internal fixed terminal 27, and switch unit $S_2$ will close, detecting the seismic acceleration $G_2$ experienced at that moment.

When a seismic acceleration $G_3$ becomes larger than the seismic acceleration $G_2$ acts on the vibration sensor and the incline component $F_2'$ of the force $F_2$ resulting from this acceleration becomes larger than the incline component $F_1'$ of the force $F_1$ due to gravitational acceleration, sphere 21 will again be dislodged from rest 13-1 and moves onto conical surface 12. The sphere will again push upward against plunger 16, and projection 19-3 on the plunger will press upward against movable unit 44-3 at pressure point A, causing unit 44-3 to bend. Movable contact 46-3 on movable unit 44-3 will come in contact with fixed contact 40A on internal fixed terminal 40, and switch unit $S_3$ will close, detecting the seismic acceleration $G_3$ experienced at that moment.

This vibration sensor could detect three stages of vibration, for example, vibration of magnitudes 5, 6 and 7. A vibration of magnitude 5 would cause switch unit $S_1$ to close and the output of that switch to be detected; a vibration of magnitude 6 would cause switch unit $S_2$ to close and the output of that switch to be detected; and a vibration of magnitude 7 would cause switch unit $S_3$ to close and the output of that switch to be detected.

If this vibration sensor is installed in a gas meter (not pictured), the gas supply can be cut off when a vibration of magnitude 5 trips switch unit $S_1$, indicating that a gas leak has been detected. A vibration of magnitude 6 would trip switch unit $S_2$, and the gas supply would be cut off but could be restored manually. A vibration of magnitude 7 would trip switch unit $S_3$, and the gas supply would be cut off in such a way that it could not be restored.

Embodiment 5

Figure 15:
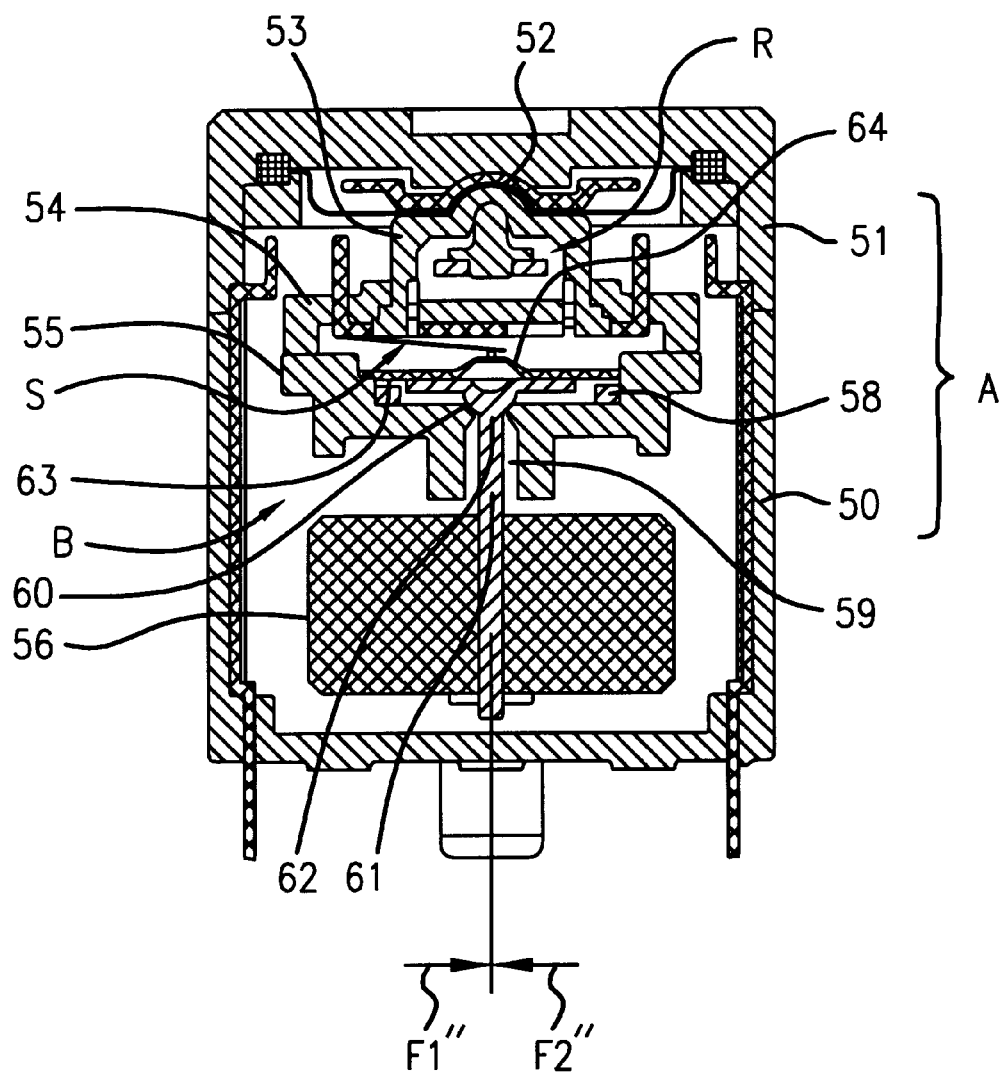
FIG. 15 shows a vibration sensor which is the fifth ideal embodiment of this invention.

A vibration sensor which is the fifth ideal embodiment of this invention is shown in FIG. 15.

In the vibration sensor of the fifth embodiment of this invention, a pendulum is employed in place of sphere 21. This sensor primarily consists of cylindrical external case 50; cap 51, which covers case 50 and with it constitutes package A; damper 52, which is attached to the inner surface of cap 51; and sensor mechanism B, which is housed in package A.

The vibration sensor mechanism B consists of suspended member 53; base 54; switch mechanism S, which is supported by base 54; guide 55; and pendulum 56. Suspended member 53 is mounted on the upper surface 54b of base 54. Member 53 is supported in package A by suspension mechanism R just as is the corresponding component in the first embodiment. Switch mechanism S is fixed to undersurface 54a of base 54 in the same way as the corresponding component is fixed in the second embodiment.

Guide 55 is fixed to the lower portion of base 54. On the upper surface of guide 55 are depression 58; aperture 59, which is in the center of depression 58; and stage 60, which is formed on the upper end of aperture 59. Rod 61 of pendulum 56 has a hemispherical surface 62 on its upper end. Plate 63 is fixed to the top of rod 61. Plunger 64 consists of a small projection in the center of plate 63.

Rod 61 goes through aperture 59. Hemispherical surface 62 is in contact with stage 60, and plate 63 is in contact with the surface of depression 58. Pendulum 56 is set in guide 55.

When a seismic acceleration $G_1$ acts on the vibration sensor and the horizontal component $F_2''$ of the force $F_{21}$ resulting from this acceleration becomes larger than the horizontal component $F_1''$ of the force $F_1$ due to gravitational acceleration, the pendulum 56 will swing at hemispherical surface 61 and plate 63 will rise up on its unilateral fulcrum, pushing upward against plunger 64. Projection 19 on the plunger will press upward against movable member 28 at pressure point A, causing member 28 to bend. Movable contact 30 on movable member 28 will come in contact with fixed contact 26A on internal fixed terminal 26, and switch unit $S_1$ will close, detecting the seismic acceleration $G_1$ experienced at that moment. (See FIGS. 6 through 8.)

When a seismic acceleration $G_2$ becomes larger than the $G_1$ acts on the vibration sensor and the horizontal component $F_2"$ of the force $F_{21}$ resulting from this acceleration becomes larger than the horizontal component $F_1"$ of the force $F_1$ due to gravitational acceleration, the pendulum 56 will again swing at hemispherical surface 61 and plate 63 will rise up on its unilateral fulcrum, pushing upward against plunger 64. Projection 19 on the plunger will press upward against movable member 28 at pressure point A, causing member 28 to bend. Movable contact 30 on movable member 28 will come in contact with fixed contact 27A on internal fixed terminal 27, and switch unit $S_2$ will close, detecting the seismic acceleration $G_2$ experienced at that moment. (See FIGS. 6 through 8.)

A vibration sensor which employs a pendulum may be converted from a two-stage to a three-stage output sensor by replacing the two-stage switch mechanism S with the three-stage switch mechanism S shown in the third and fourth embodiments.

Figure 16:
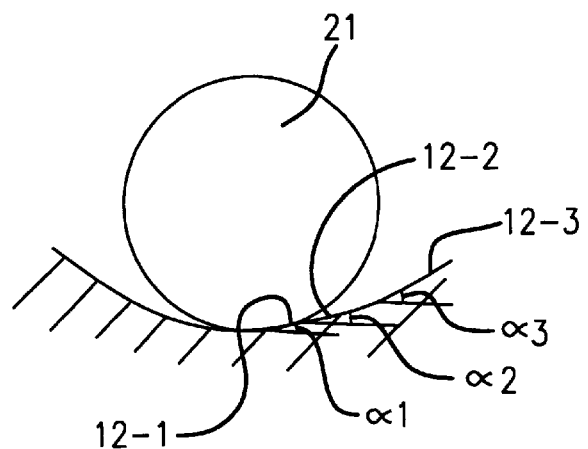
FIG. 16 is a simplified view of a portion of the sensor mechanism in a vibration sensor according to this invention.
Figure 17:
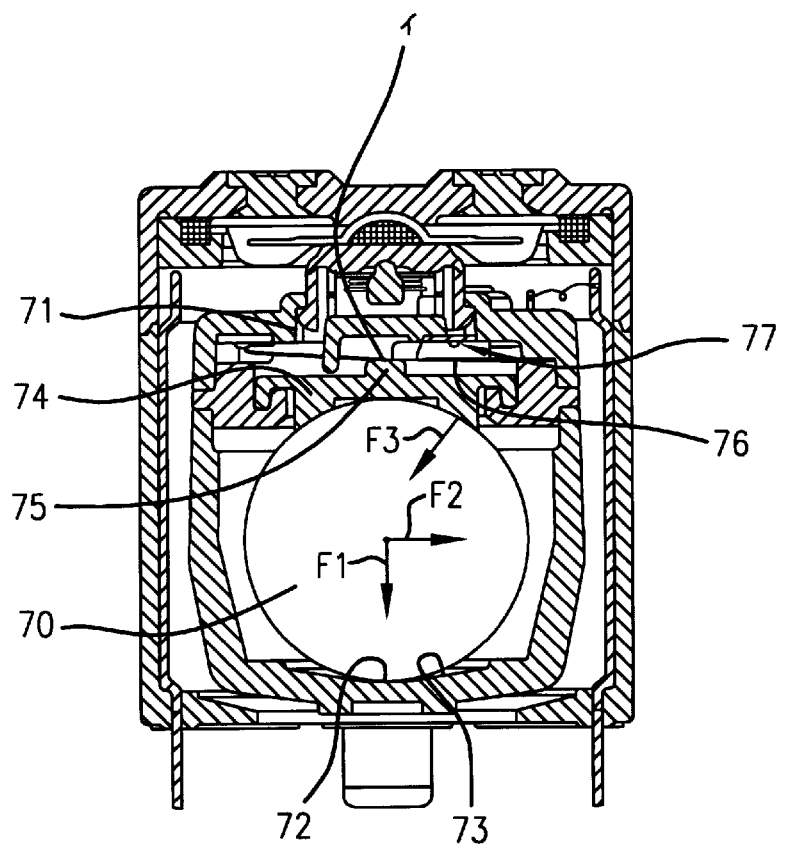
FIG. 17 is a vertical cross section of a vibration sensor belonging to the prior art.

In the sensor mechanism B described above, the conical surface 12 which is formed on the lower surface 11 of internal case 9 has an incline α, and the center of this surface serves as rest 13, the stage on which sphere 21 is seated. It would also be possible to use the design shown in FIG. 16, in which the conical surface consists of concentric arcs, each with an incline surface. The surface would then comprise conical surfaces 12-1, 12-2 and 12-3. Incline $α_2$ of conical surface 12-2 is larger than incline $α_1$, of surface 12-1; and incline $α_3$ of surface 12-3 is larger than incline $α_2$. Each surface should have an incline which corresponds to the actuating vibration which causes sphere 21 to move onto that incline (conical surface 12-1, 12-2 or 12-3).

Thus an earthquake of a given magnitude will cause sphere 21 to move onto the incline which corresponds to that magnitude and through plunger 16 actuate switch unit $S_1$ or $S_2$. A single vibration sensor can produce multistage output corresponding to the seismic (or vibrational) acceleration.

In embodiments 1 through 5 discussed above, the switch mechanism S is placed over sphere 21; the switch mechanism S, however, could easily be placed under the sphere.

As mentioned above, according to the vibration sensor disclosed in claim 1, each switch unit outputs a signal when it detects a vibrational acceleration which corresponds to its own operational sensitivity. Thus a single vibration sensor can produce multistage outputs corresponding to various vibrational acceleration values.

According to the vibration sensor disclosed in claim 2, the movable member operates in a series of stages depending on the vibrational acceleration so that for a given vibration, the movable member comes in contact with whichever of the fixed contacts that corresponds to that particular vibrational acceleration. Thus a single vibration sensor can produce multistage outputs corresponding to various vibrational acceleration values.

According to the vibration sensor disclosed in claim 3, the movable member corresponding to a given acceleration will operate when that acceleration is experienced, and it will come in contact with its paired fixed contacts. Thus a single vibration sensor can produce multistage outputs corresponding to various vibrational acceleration values.

According to the vibration sensor disclosed in claim 4, the movable gravitation element is a sphere, and the sensor can produce multistage outputs.

According to the vibration sensor disclosed in claim 5, the same function of the sensor in any of claims 1-3 is achieved by the sensor of claim 5. In addition to being able to use the sensor, the sensor's operating sensitivity is adjustable and multistage outputs can be produced.

According to the vibration sensor disclosed in claim 6, the gap between the contact on the movable member and the fixed contact can be adjusted by the gap adjusting means for that purpose. In addition to being able to use the sensor, its sensitivity is adjustable and multistage outputs can be produced.

According to the vibration sensor disclosed in claim 7, the same function of the sensor in any of claims 1-6 is achieved by the sensor of claim 7. In addition, the use of snap-action switches for the switch units minimizes any fluctuation in the operating sensitivity.

According to the vibration sensor disclosed in claim 8, a vibrational acceleration of a given magnitude will cause the sphere to move onto the inclined surface which corresponds to that magnitude of acceleration, and this will exert pressure on the plunger to actuate one of the switch units. Thus a single vibration sensor can produce multistage outputs corresponding to various vibrational accelerations.

According to the vibration sensor disclosed in claim 9, the movable gravitation element is a pendulum, and the sensor can produce multistage outputs.

While the invention has been described in detail with reference to a number of different embodiments it should be apparent to those skilled in the art that many modifications and variations are possible without departure from the scope and spirit of this invention as defined in the appended claims.

What is claimed is:

1. A vibration sensor for sensing a vibrational acceleration, comprising:

a movable gravitation element which is movable by a vibrational acceleration;

a plunger detecting a movement of said movable gravitation element; and a switch mechanism actuated by said plunger, said switch mechanism comprising a plurality of switch units each having a different operating sensitivity.

2. The vibration sensor according to claim 1, wherein each of said plurality of switch units, comprises:

a movable member actuated by said plunger which is displaced by said movable gravitation element; and a plurality of fixed contacts to come into contact with said movable element, wherein the operating sensitivity of each of said plurality of switch units is adjusted by a spatial relationship of fixed contacts with said movable member.

3. The vibration sensor according to claim 1, wherein each of said plurality of switch units, comprises:

a plurality of movable members actuated by said plunger which is displaced by said movable gravitation element; and a plurality of corresponding fixed contacts to come into contact with said plurality of said movable elements, wherein the operating sensitivity of each of said plurality of switch units is adjusted by a spatial relationship of said fixed contacts with respect to said movable member.

4. The vibration sensor according to claim 1, 2, or, wherein said movable gravitation element is a sphere.

5. The vibration sensor according to claim 1, wherein said operating sensitivity of each of said plurality of switch units is adjusted by a means for adjusting said spatial relationship of said fixed contacts with said movable member.

6. The vibration sensor according to claim 5, wherein said adjusting means adjusts a gap between said fixed contacts and a movable contact on said movable member.

7. The vibration sensor according to claim 1, wherein said switch units are snap-action type switches.

8. The vibration sensor according to claim 1, wherein said movable gravitation element moves onto a plurality of inclined surfaces corresponding to said different operating sensitivities, when an incline component force $F_2'$ of vibration acceleration force $F_2$ becomes larger than an incline component force $F_1'$ of gravitation acceleration force $F_1$.

9. The vibration sensor according to claim 1, 2, or 3, wherein said movable gravitation element is a pendulum.

* * * * *